(12) United States Patent
Hilmas et al.

(10) Patent No.: US 7,090,938 B2
(45) Date of Patent: Aug. 15, 2006

(54) METHOD OF PREPARING A SOLID OXIDE FUEL CELL

(75) Inventors: Gregory Hilmas, Rolla, MO (US); Dustin Beeaff, Rolla, MO (US)

(73) Assignee: Curators of the University of Missouri, Columbia, MO (US)

( * ) Notice: Subject to any disclaimer, the term of this patent is extended or adjusted under 35 U.S.C. 154(b) by 413 days.

(21) Appl. No.: 10/342,563

(22) Filed: Jan. 15, 2003

(65) Prior Publication Data

US 2004/0137286 A1    Jul. 15, 2004

(51) Int. Cl.
   *H01M 8/02* (2006.01)
(52) U.S. Cl. .................. 429/12; 29/623.1
(58) Field of Classification Search ........... 429/31, 429/12

See application file for complete search history.

(56) References Cited

U.S. PATENT DOCUMENTS

| | | | |
|---|---|---|---|
| 5,217,822 A * | 6/1993 | Yoshida et al. | 429/33 |
| 5,460,770 A * | 10/1995 | Egerton et al. | 264/681 |
| 5,741,605 A * | 4/1998 | Gillett et al. | 429/31 |
| 6,824,907 B1 * | 11/2004 | Sarkar et al. | 429/31 |
| 6,838,203 B1 * | 1/2005 | Zheng | 429/31 |
| 6,846,588 B1 * | 1/2005 | Sarkar | 429/31 |

OTHER PUBLICATIONS

*Oral Presentation by Beeaff, D., 26th Annual International Conference on Advanced Ceramics and Composties, Cocoa Beach, FL, Jan. 16, 2002, slide 2-14.
**Oral Presentation by Beeaff, D., "Mechanical Characterization of Honeycomb Electrode Support Structures", Electrochemical Society Meeting, Salt Lake City, UT (Fall 2002), Electrochemical Society Proceedings vol. 2002-26, pp. 122-132.

* cited by examiner

Primary Examiner—Mark Ruthkosky
(74) Attorney, Agent, or Firm—Kenyon & Kenyon LLP

(57) ABSTRACT

A solid oxide fuel cell having a multichannel electrode architecture and method for preparing the same, the method including forming a first carbon laden composition, including a first thermoplastic binder, into a rod, applying a first zirconia laden composition, including a second thermoplastic binder, onto the rod to form a composite feed rod, extruding the composite feed rod to form a controlled geometry filament, bundling the extruded composite feed rod to form a multicellular feed rod, extruding the multicellular feed rod to form a multicellular rod, cutting the multicellular rod into multicellular discs, applying a zirconia laden material to one surface of a multicellular discs to form a multicellular structure, and heating processing the multicellular structure. The fuel cell is completed by adding anode and cathode materials to the multicellular structure.

19 Claims, 3 Drawing Sheets

Sintered 2 hours at 1450 °C, $\rho$ = 5.75 g·cc$^{-1}$ (97% dense)

20kV 30mm W.D. 30°Tilt

Porous LaSrMnO$_3$

ZrO$_2$

NiO/ZrO$_2$

METHOD OF PREPARING A SOLID OXIDE FUEL CELL

FIELD OF THE INVENTION

The invention relates to solid oxide fuel cells and to a method for preparing the same.

BACKGROUND INFORMATION

A fuel cell utilizes the energy produced by a chemical reaction to supply a voltage that can be used to power other devices. This direct conversion process increases the efficiency of power generation by removing mechanical steps required by, for example, traditional turbine plants. Additionally, the combination of higher efficiency and electrochemical processes results in an environmentally favorable product. Fuel cells generate significantly less $NO_x$ and negligible quantities of carbon dioxide compared to internal combustion engines. A fuel cell powered vehicle, for example, may generate one ten-thousandth the quantity of $NO_x$ and non-detectable quantities of CO.

The solid oxide fuel cell ("SOFC") possesses three basic parts: An anode that produces electrons, a cathode that consumes electrons, and an electrolyte that conducts ions but prevents electrons from passing. Using hydrogen gas as the fuel passed to the anode and oxygen gas as the oxidant passed to the cathode, a current of oxygen anion charge carriers is produced according to the following reactions:
at the anode: $2H_2+2O^{2-} \rightarrow 2H_2O+4e^-$
at the cathode: $O_2+4e^- \rightarrow 2O^{2-}$
for the cell: $2H_2+O_2 \rightarrow 2H_2O+heat$ A conventional SOFC utilizes a $ZrO_2$ based ceramic for an electrolyte. The anode is conventionally fabricated from a $NiO-ZrO_2$ composite. Lanthanum manganate ($LaMnO_3$) based materials may be used for the cathode material.

During operation, internal losses may be experienced within the SOFC that reduce the efficiency and potential. These losses may be minimized in the electrolyte simply by making it thinner. However, the act of reducing the thickness of the electrolyte may require either the anode or the cathode to be the load bearing structure. The cathode may be the more stable of the two electrodes. The anode may experience dimensional changes during the reduction of the NiO material of ~40 vol %.

A single cell may be thermodynamically limited by the nature of the overall reaction and the concentration of oxygen on either side of the electrolyte. A single cell may produce about one volt depending on the type of gas being oxidized. Cells may be combined in parallel (to increase current) and series (to increase voltage) to create stacks. The solid-state nature of a SOFC allows easier fabrication of stacks compared to other systems, such as those containing liquid electrolytes.

In order to supply oxygen efficiently to the electrode/electrolyte interface, the electrodes may be constructed to be highly porous, however, this porosity may reduce the mechanical tolerance of the structure. Therefore, SOFCs may be constructed in a variety of geometries. A planar cell, such as a flat plate construction may have a self supporting anode, cathode, or electrolyte sheet onto which the other components are mounted.

U.S. Pat. No. 5,217,822 issued to Yoshida describes a SOFC including an anode made of porous sintered zirconia/magnesia/nickel on which a zirconia/yttria electrolyte element is superimposed. SOFCs with this type of geometry conventionally utilize a thick support electrode to support a thin electrolyte layer. For example, the Yoshida patent describes an anode plate on the order of 4 mm thick, which suffers reduced strength when sintered, and onto which an electrolyte layer on the order of 44 micrometers thick is ultimately applied. Mechanical tests have shown that an electrode with a thickness at least greater than 100 micrometers is necessary to support an electrolyte with a thickness at most less than 20 micrometers.

Another conventional SOFC construction is the tubular geometry, which is formed by fabricating the cathode, electrolyte, and anode in concentric cylindrical layers. U.S. Pat. No. 5,741,605, issued to Gillett et al., describes a fuel stack chamber configuration, where many fuel cells may be commonly supported and connected for use in large scale power generating devices. These tubular SOFCs include self supporting electrodes on the order of 1 to 3 mm thick, between which an electrolyte on the order of 0.001 to 0.1 mm thick is placed.

SUMMARY OF THE INVENTION

The invention is an application of an extrusion process for improving the fracture characteristics of SOFCs. The current invention utilizes this process to create a multi-channel electrode architecture that will improve the strength of solid oxide fuel cells.

The present invention improves the mechanical properties of the cell, in theory, providing up to a 10 times increase in mechanical strength over SOFCs of conventional planar geometry, by utilizing a co-extrusion process, and eventually forming the constituent ceramics into a multicellular lattice structure.

This fibrous monolith co-extrusion processing method according to the present invention allows for fine control of the distribution and size of a two-phase material system. Since the multicellular structure that remains may be fired to full density, the structure may possess improved mechanical properties.

The invention improves the mechanical strength of the planar SOFC, allowing broader application of the planar SOFC design.

DETAILED DESCRIPTION OF THE EXAMPLE EMBODIMENTS

Figure 1:
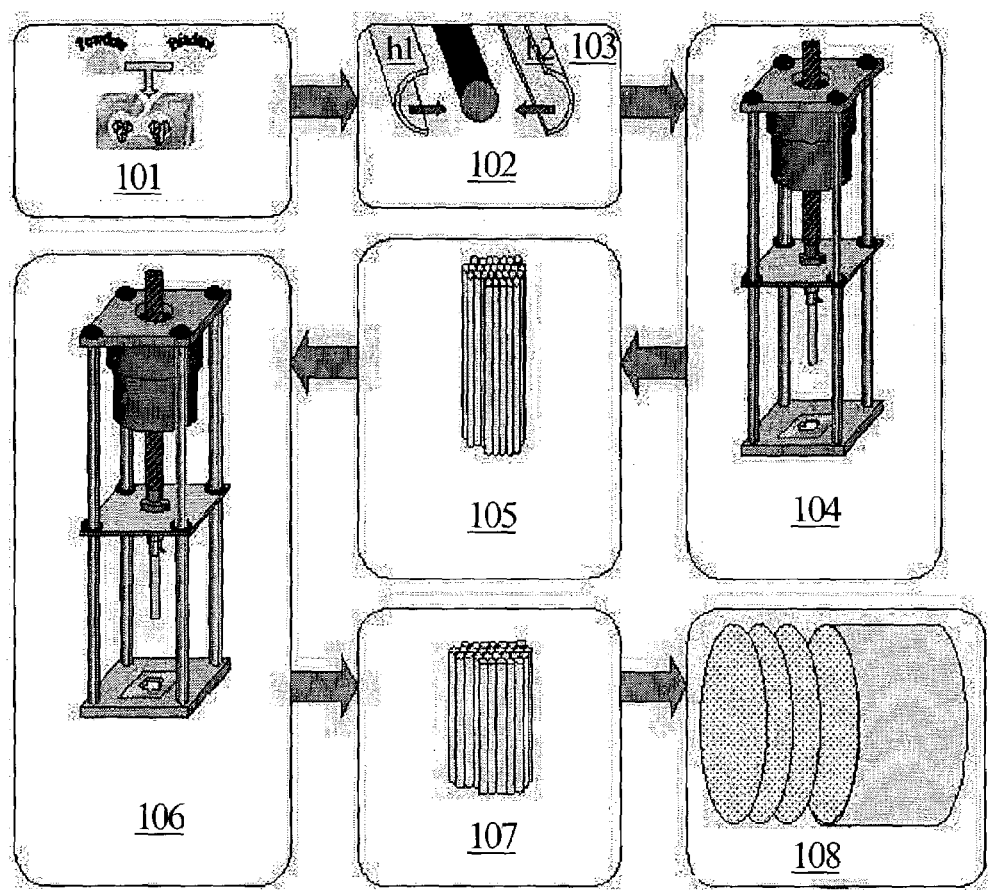
FIG. 1 illustrates a representation of an example embodiment of the method according to the present invention.

FIG. 1 illustrates an example embodiment of the method according to the present invention. At 101, a carbon laden material may be mixed with a thermoplastic binder. The core material in the extrudate may be composed of a fugitive material, for example, a high-carbon loaded polymer. For example, Monarch 280 or Cabot.RTM Black Pearl 2000 carbon black, available from Cabot Corporation, having a specific surface area of 1500 m.sup.2/g and an average particle size of 12 nanometers, may be used in the carbon laden composition. The binders may consist of ethylene based co-polymers, such as, ethylene-ethyl acetate ("EEAI"), for example, DPDA-618NT available from Union Carbide, and ethylene-butyl acrylate ("EBA"), available from Elf Atochem. The volume percent of the carbon laden composition may range from 30% to 70%. The solids loading may be, for example, 30% by volume.

At 102, The mixture is formed into a cylindrical rod. This formation procedure may be, for example, by a molding procedure performed above the glass transition temperature for the polymer or extrusion. Although a cylindrical rod is used in this example, the rod may have a cross section of any shape, such as polygonal or round.

At 103 a zirconia-laden composition including a thermoplastic binder is applied to the outer surface of the carbon rod. This coating may be pre-molded, for example, in two cylindrical shell shaped halves h1, h2 and adhered to the rod by mechanical pressure. The shell material may be fabricated with the an ionic conducting zirconia, which is also suitable for use as an electrolyte in the completed fuel cell. The zirconia material may be fully stabilized, such as grade HSY-8, specific surface area of 7.2 $m^2 \cdot g^{-1}$, average particle size of 0.20 µm, or partially stabilized, such as grade HSY-3, specific surface area of 5.8 $m^2 \cdot g^{-1}$, average particle size of 0.59 µm zirconia, both grades available from Daiichi Kigenso. The solids loading of this phase may be, for example, 50% by volume.

At 104, the composite feed rod may then be extruded to form a controlled geometry filament. Rheological control may be maintained during the extrusion process. For example, the viscosity of the coating may be lower than the viscosity of the core to prevent the core from migrating to the outside of the coating during extrusion. The viscosities of the materials may be controlled to maintain specific torques, for example, in a high-shear mixer, such as the Plasticorder available from C. W. Brabender. The zirconia laden material may achieve, for example, a torque reading of 10 N·m at 150° C. and a mixing speed of 60 rpm. The carbon laden material may achieve, for example, a torque reading of 20 N·m at 150° C. and a mixing speed of 60 rpm. Processing aides may be added to control the viscosity of the material during mixing and extrusion. The processing aides may be, for example, heavy mineral oil ("HMO"), available from Sigma-Aldrich and methoxypolyethylene glycol ("MPEG"), for example, Carbowax MPEG 550 available from Union Carbide.

At 105, the filament may be cut to the desired length to form a variety of filaments which are then rebundled. During rebundling, the filaments may be laminated. The filament may take a variety of shapes including having a circular or polygonal cross section. For example, by ram and die extrusion, a tapered cone may be used to form a filament of diameter, for example, of 0.5 mm to 2.3 mm.

At 106, the filament bundle may then be extruded to form a multicellular filament, shown at 107. For example, using a spinneret will produce a filament of diameter of, for example, 250 microns. The extrusion process also takes place above the glass transition temperature for the polymer used.

At 108, the multi-cellular filaments may then be rebundled into a desired shape, for example, a cylindrical rod, which may then be cut into sections, for example, discs. The diameter of the disks may be determined by the final lamination die size. Although discs are used in the example, the sections may have a cross section of any shape, for example, polygonal.

A thin zirconia-laden material may then be applied, for example, by lamination, to one surface of the disc. Thin film methods may be used to apply this material, such as physical vapor deposition, chemical vapor deposition, or evaporation. Tape casting, for example, has been shown to produce the dense, thin zirconia layers necessary for an SOFC. Pyrolysis and sintering, may then be performed, during which the polymer binder is burned out of the disc, leaving the desired lattice structure. Burning out the carbon-loaded binder leaves channels with controlled dimensions.

Figure 2:
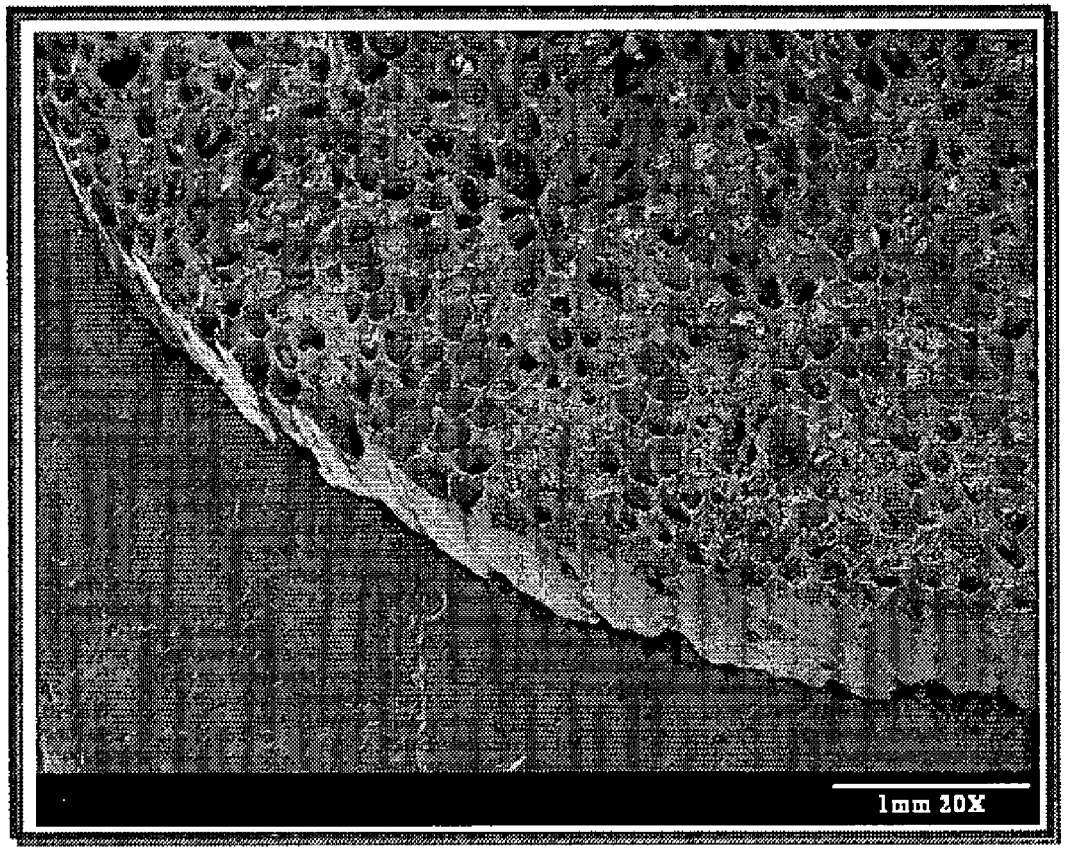
FIG. 2 shows a photomicrograph of a 97% dense sintered disc prepared according to the method of the present invention.

FIG. 2 shows a photomicrograph of a 97% dense specimen which has been sintered for 2 hours at 1450° C. The carbon-laden material acts as a fugitive, leaving a multicellular structure of zirconia with one open face and one zirconia coated face.

Anodic and cathodic material precursors may then be applied to the surface of the faces. For example, a metal oxide film may be deposited using an aqueous solution containing a chelated metal ion in a polymer. A dip coating procedure may be used, after which a curing procedure may be used to produce a film. A low-temperature conversion of the precursors may then be performed, after which the precursors function as electrodes and a complete SOFC is obtained. A spin coating process may be used to deposit the electrode materials. For example, under vacuum, a lanthanum-strontium manganate (LSM) precursor material may be applied to the porous side of the disk. Reapplication of atmospheric pressure will drive the solution into the channels, forming a coating over the entire surface. Drying and low-temperature firing may be used to convert the precursor into a thin layer of LSM. The anode may be applied using a precipitate spin coating process.

Figure 3A:
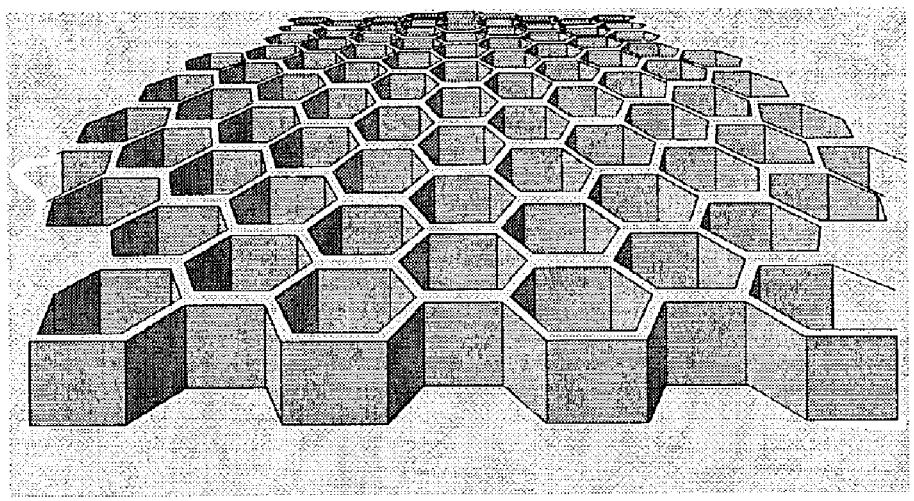
FIG. 3a illustrates a perspective view of an example embodiment of a honeycomb lattice structure prepared according to the present invention.
Figure 3B:
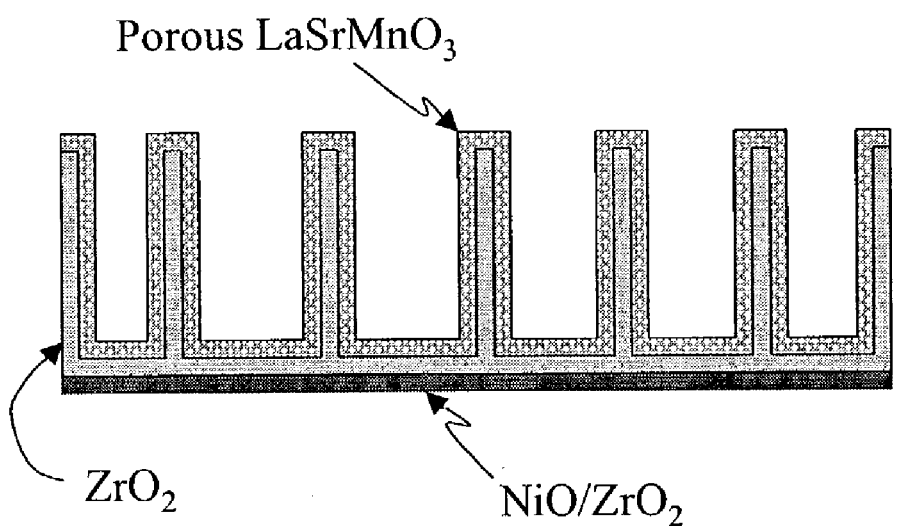
FIG. 3b illustrates a cross section view of an example embodiment of a honeycomb lattice structure prepared according to the present invention.

FIG. 3a illustrates a perspective view of a zirconia coated honeycomb lattice structure prepared according to the present invention. FIG. 3b illustrates a cross section of the structure shown in FIG. 3a. The utilization of a zirconia backbone allows use of a thinner electrode layer. If the anode thickness is also reduced to 500 µm, this further increases the power density to 0.75 W/cm$^2$ at a current density of 1.8 A/cm$^2$; a 50% increase in power density over the baseline structure. Additionally, the parallel pore channel structure increases the surface area of the electrode/electrolyte interface. The reduction reaction of oxygen can only occur at the triple points, small contact regions where the electrode, electrolyte and gas meet. The parallel pore channel architecture increases the effective surface area compared to conventional planar structure SOFCs.

For comparison with materials prepared in accordance with the present invention, the findings of Selçuk and Atkinson regarding tests of the mechanical strength of yttria-stabilized zirconia (YSZ), a material that may be used in the construction of SOFCs, follow. Impulse excitation tests on 10 and 20 mol % $Gd_2O_3$ doped $CeO_2$, 3 and 8 mol % $Y_2O_3$ stabilized $ZrO_2$ (TZP and YSZ), and 75 mol % NiOYSZ were performed as described in A. Selçuk and A. Atkinson, "Elastic Properties of Ceramic Oxides Used in Solid Oxide Fuel Cells(SOFC)," J. Eur. Cer. Soc., 17 1523–1532 (1997). Using this technique they reported a Young's modulus of ~220 GPa for fully dense YSZ and a shear modulus of ~83 GPa. These values are reduced to ~170 and 60 GPa, respectively, at 10% porosity. Reported room-temperature flexural strengths of YSZ vary widely from 170–416 MPa, depending on test procedure and sample size.

D'Souza and Sammes provide a study on the mechanical properties of lanthanum strontium manganite (LSM), a material that may be used for SOFC construction, as described in C. M. D'Souza and N. M. Sammes, "Mechanical Properties of Strontium-Doped Lanthanum Manganite," J. Am. Cer. Soc., 83 [1]47–52(2000). The study used three point bend tests on fully dense specimens. The findings described include information on the effect of temperature on the mechanical strength of LSM. Estimates of the strength of LSM with 30% porosity are around 25 MPa.

Currently, structures of similar materials have been fabricated using the method of the present invention, containing 70% open channels. These structures have been tested in biaxial flexure to obtain an average strength of 244 Mpa. Details concerning the fabrication and strength of exemplary structures prepared according to the present invention are set forth below.

EXAMPLE 1

Example Embodiment of the Method of the Present Invention

A batch of graphite-loaded polymer was pressed to form a solid rod of 15.5 mm diameter using a 5 ton ram press at a load of 2000 pounds and 150° C. Half shells of 3.25 mm thick polymer similarly loaded with zirconia were produced by pressing the zirconia-laden material in dies at 120° C. and 5000 pounds. The zirconia shells were laminated to the core rod and extruded through a 2 mm spinneret to produce a filament with a ~1.5 mm carbon loaded core. The filament was cut to an arbitrary length and re-bundled to produce a 22 mm feedrod containing ~80 cores of carbon surrounded by an interpenetrating matrix of zirconia loaded polymer. This feedrod was extruded through a 2 mm spinneret. The diameter of the carbon loaded material was then reduced to ~150 μm. These filaments were bundled together to produce a cylindrical block that was sliced into 1.5 mm thick disks.

A tape cast layer of zirconia was laminated to the surface of the block to serve as the electrolyte. After firing, a disk was produced containing a dense zirconia substrate with a dense electrolyte layer and a controlled-porosity layer possessing approximate 6400 channels. Sintering shrinkage reduced the diameter of the channels to ~125 μm diameter with a wall thickness of 25 μm.

EXAMPLE 2

Example Embodiment of the Method of the Present Invention

A batch of graphite-loaded polymer was pressed into a solid rod of 15.5 mm diameter. A 3.25 mm thick shell of polymer similarly loaded with ZrO2 was clad to the core rod. After extrusion through a 1 mm spinneret, a filament was produced with a ~700 μm carbon loaded core. The filament was cut to an arbitrary length and re-bundled to produce a 22 mm feedrod containing ~480 cores of carbon surrounded by an interpenetrating matrix of ZrO2 loaded polymer. This feedrod was extruded through a 600 μm spinneret. The diameter of the carbon loaded material was then reduced to ~19 μm. These filaments were bundled together to produce a cylindrical block that was sliced into 0.5 mm thick disks.

A tape cast layer of ZrO2 was laminated to the surface of the block to serve as the electrolyte. After firing, a disk was produced containing a dense zirconia substrate with a dense electrolyte layer and a controlled porosity layer possessing in excess of 11,000 channels. Sintering shrinkage reduced the diameter of the channels to ~16 μm diameter.

What is claimed is:

1. A method of preparing a solid oxide fuel cell having a multichannel electrode architecture, comprising:
   forming a first carbon laden composition, including a first thermoplastic binder, into a rod;
   applying a first zirconia laden composition, including a second thermoplastic binder, onto the rod to form a composite feed rod;
   extruding the composite feed rod to form a filament;
   bundling a plurality of filaments to form a multicellular feed rod;
   extruding the multicellular feed rod to form a multicellular rod;
   cutting the multicellular rod along a cross section to form at least one multicellular structure;
   applying a zirconia laden material to one surface of the multicellular structure; and
   heat processing the multicellular structure.

2. The method according to claim 1, wherein the viscosity of the zirconia laden composition is lower than the viscosity of the carbon laden composition.

3. The method according to claim 2, wherein the viscosities of the materials are controlled to maintain selected torques during extrusion.

4. The method according to claim 2, further comprising:
   adding the first thermoplastic binder to the first carbon laden composition in a manner in which the viscosity of the mixture is controlled.

5. The method according to claim 1, further comprising:
   laminating the filaments after bundling and before extrusion.

6. The method according to claim 1, wherein the thermoplastic binder includes a polymer.

7. The method according to claim 6, wherein extrusion takes place at a temperature equal to or greater than the glass transition phase temperature and less than the decomposition temperature of the polymer.

8. The method according to claim 6, wherein rod is formed by a molding process performed above a glass transition temperature of the polymer.

9. The method according to claim 1, wherein the same compound is used as the first and second thermoplastic binders.

10. The method according to claim 1, wherein the volume % of the carbon laden composition is between 30% and 70%.

11. The method according to claim 1, wherein the carbon laden composition is one of a carbon black material and a graphite material.

12. The method according to claim 1, wherein the zirconia laden composition is applied to the rod using mechanical pressure.

13. The method according to claim 12, wherein the zirconia laden composition is applied to the rod in a pre-molded form.

14. The method according to claim 1, wherein the filament has a polygonal cross section.

15. The method according to claim 1, wherein the filament has a circular cross section.

16. The method according to claim 1, wherein the multicellular structure is configured in a honeycomb geometry.

17. The method according to claim 1, pyrolysis is used to heat process the multicellular structure.

18. The method according to claim 1, wherein sintering is used to heat process the multicellular structure.

19. The method according to claim 1, further comprising: coating a first face of the multicellular structure with an anodic precursor material and coating a second face of the multicellular structure with a cathodic precursor material to form a precursor coated multicellular structure; and heat processing the precursor coated multicellular structure to form a fuel cell having an anode and a cathode.

* * * * *